US012202320B2

(12) United States Patent
Pennala et al.

(10) Patent No.: US 12,202,320 B2
(45) Date of Patent: Jan. 21, 2025

(54) REMOVABLE ADJUSTABLE PANEL LOCATING BRACKETS

(71) Applicant: FCA US LLC, Auburn Hills, MI (US)

(72) Inventors: David W Pennala, Howell, MI (US); Marco Antonio Lucas Hernandez, Metepec (MX); Jason E Schultz, Clarkston, MI (US)

(73) Assignee: FCA US LLC, Auburn Hills, MI (US)

( * ) Notice: Subject to any disclaimer, the term of this patent is extended or adjusted under 35 U.S.C. 154(b) by 175 days.

(21) Appl. No.: 17/991,320

(22) Filed: Nov. 21, 2022

(65) Prior Publication Data

US 2024/0166028 A1    May 23, 2024

(51) Int. Cl.
*B60J 1/12* (2006.01)
*B60J 1/00* (2006.01)
*B60J 1/08* (2006.01)

(52) U.S. Cl.
CPC ............... *B60J 1/12* (2013.01); *B60J 1/006* (2013.01); *B60J 1/007* (2013.01)

(58) Field of Classification Search
CPC ..... B60J 1/17; B60J 1/085; B60J 1/006; B60J 1/007; B60J 1/12; E04F 13/0808; E04F 13/0855
See application file for complete search history.

(56) References Cited

U.S. PATENT DOCUMENTS

2024/0110414 A1* 4/2024 Bowman ................ E05C 3/044

FOREIGN PATENT DOCUMENTS

| EP | 659954 A1 | * | 6/1995 | .......... E04F 13/0855 |
| GB | 2155072 A | * | 9/1985 | .......... E04F 13/0855 |
| WO | WO-2017016955 A1 | * | 2/2017 | ........... A47B 95/008 |

OTHER PUBLICATIONS www.youtube.com/watch?v=2ueloPYAyCM <http://www.youtube.com/watch?v=2ueloPYAyCM>, dated Dec. 20, 2021 (and accessed Sep. 30, 2022).

* cited by examiner

*Primary Examiner* — Daniel J Colilla
(74) *Attorney, Agent, or Firm* — Jeremy J. Klobucar

(57) ABSTRACT

A panel adjustment assembly for a panel of a vehicle includes a first bracket fixedly coupled to the panel. The first bracket includes a first receiving opening coaxial with a first longitudinal axis. A second bracket has a second longitudinal axis and a channel coaxial with the first longitudinal axis and a second receiving opening coaxial with the second longitudinal axis. A first adjuster coaxial with the first longitudinal axis is coupled through the second bracket and into the first receiving opening in the first bracket, said first adjuster adjusting a first gap between the first bracket and the second bracket. A second adjuster is disposed within the receiving channel and partially within the second bracket. The second adjuster has a locating pin extending therefrom and is received within the vehicle. The second adjuster adjusts a second gap between the vehicle and the second bracket.

20 Claims, 5 Drawing Sheets

REMOVABLE ADJUSTABLE PANEL LOCATING BRACKETS

The present disclosure relates to vehicles with removable panels and, more particularly, to a removable panel that is adjustable.

BACKGROUND

This section provides background information related to the present disclosure which is not necessarily prior art.

Open air vehicles are becoming increasingly popular. Vehicles such as vehicles with convertible tops are open air. Other vehicles such as the Jeep Wrangler® also have convertible top. In one configuration of the Jeep Wrangler, a power folding top is provided in which the center of the roof is fabric and retracts rearward. The remaining portions of the vehicle remain intact when the roof is retracted. Solid portions of the vehicle may be removed. The doors of the Jeep Wrangler are removable. Likewise, the rear quarter panel windows may also be removed.

During the manufacture of vehicles, there are various tolerances for the body and the components. Further, various seals and the like wear overtime. When the removable panels are removed maintaining a proper fit over time is important.

SUMMARY

This section provides a general summary of the disclosure and is not a comprehensive disclosure of its full scope or all of its features.

The present disclosure allows the lateral and vertical adjustability of a removable panel on a vehicle.

In one aspect of the disclosure, a panel adjustment assembly for a panel of a vehicle includes a first bracket fixedly coupled to the panel. The first bracket includes a first receiving opening coaxial with a first longitudinal axis. A second bracket has a second longitudinal axis and a channel coaxial with the first longitudinal axis and a second receiving opening coaxial with the second longitudinal axis. A first adjuster coaxial with the first longitudinal axis is coupled through the second bracket and into the first receiving opening in the first bracket, said first adjuster adjusting a first gap between the first bracket and the second bracket. A second adjuster is disposed within the receiving channel and partially within the second bracket. The second adjuster has a locating pin extending therefrom and is received within the vehicle. The second adjuster adjusts a second gap between the vehicle and the second bracket.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
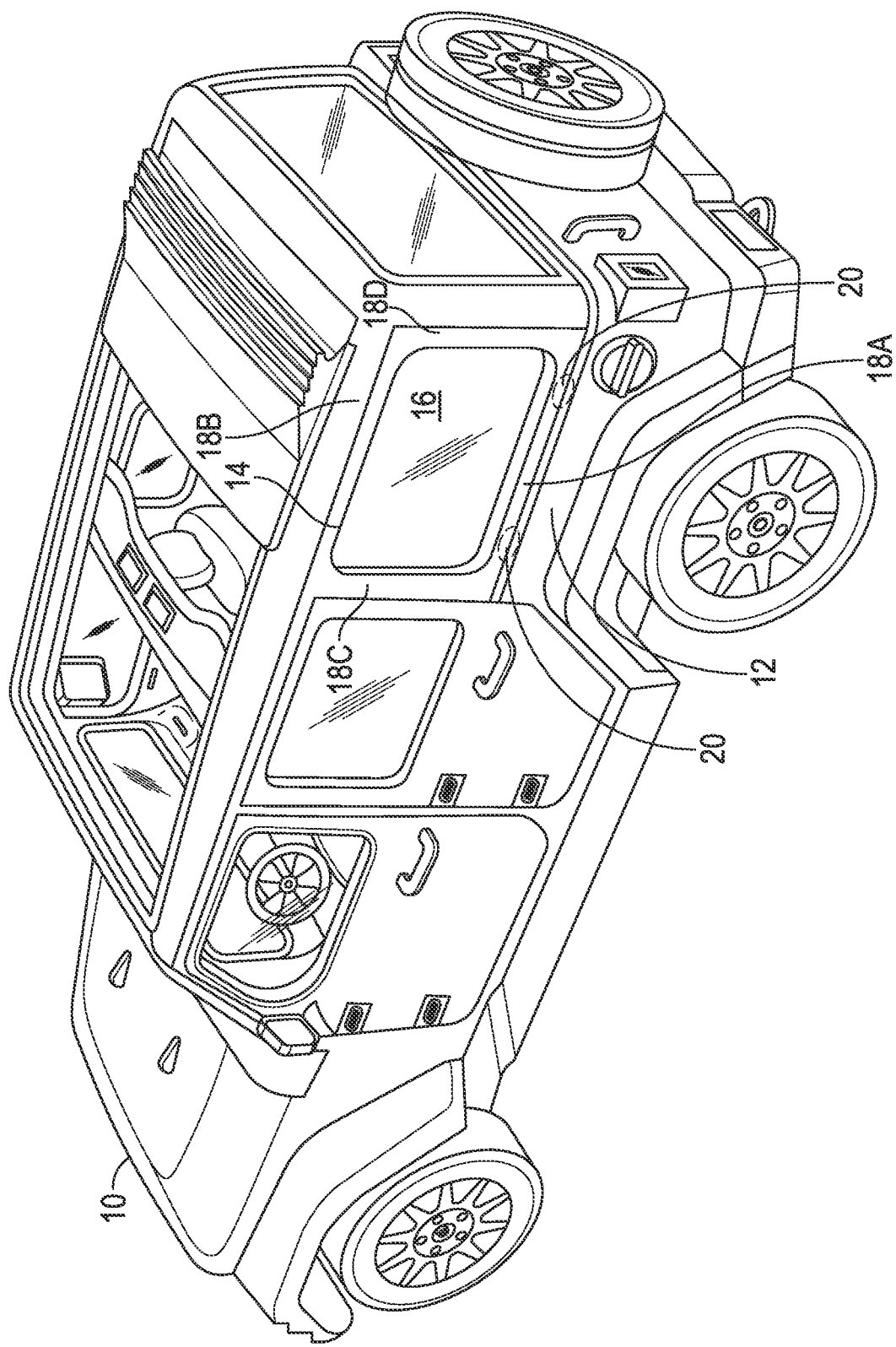
FIG. 1 is a perspective view of a vehicle having a removable window assembly.

Referring now to FIG. 1, a vehicle 10 is illustrated. The vehicle 10, in this example, has a pair of rear quarter panels, one quarter panel 12 is illustrated on the driver's side of the vehicle. In this example, a panel 14 is illustrated and coupled to the vehicle 10. The panel 14 in this example is a removal window assembly that comprises a window 16 and a window frame 18. The window 16 is formed of glass or a composite material. The window frame 18 is formed of material such as steel or aluminum or from a composite material. The window frame 18, in this example, surrounds the window 16. The window frame 18 has a lower frame portion 18A, an upper frame portion 18B, a front frame portion 18C and a rear frame portion 18D. The panel 14 in other examples is completely formed or glass or metal absent the attachment mechanisms. The circled locations 20 illustrate the area where the panel 14 is secured to the vehicle 10 by the panel adjustment assembly of the present disclosure.

Figure 2:
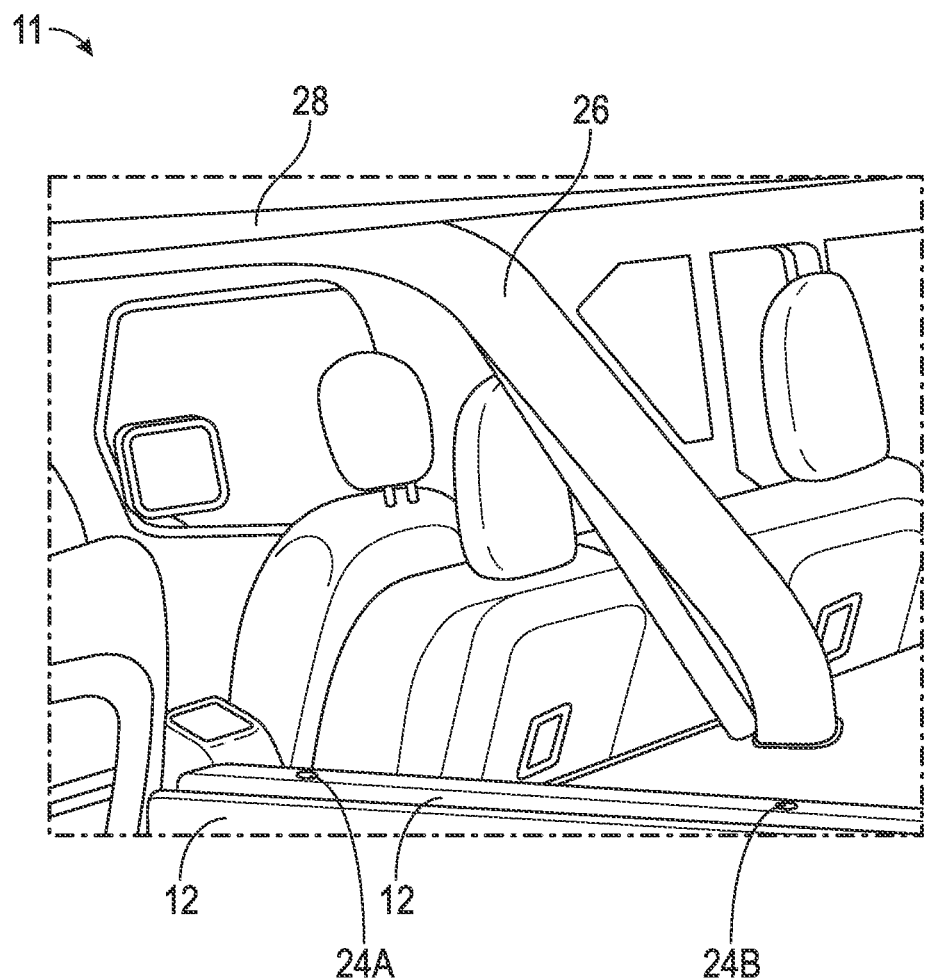
FIG. 2 is a perspective view of a vehicle having the removable window assembly removed.

Referring now to FIG. 2, the vehicle 10 is illustrated with the panel 14 removed therefrom. In this example, the rear quarter panel 12 is illustrated having a window rest 22 adjacent thereto. The window rest 22 is integrally formed with the rear quarter panel 12 or is a separate component. The window rest 22 has a first opening 24A and a second opening 24B that are used for receiving locating pins on the panel 14 as will be described in further detail below.

The vehicle 10 also has a roll bar 26 and a roof rail 28. The roof rail 28 extends longitudinally. The roll bar 26 extends longitudinally and angularly downward relative to the plane the vehicle 10 travels on. At least a portion of the roll bar is adjacent to the roof rail 28 in this example.

Figure 3A:
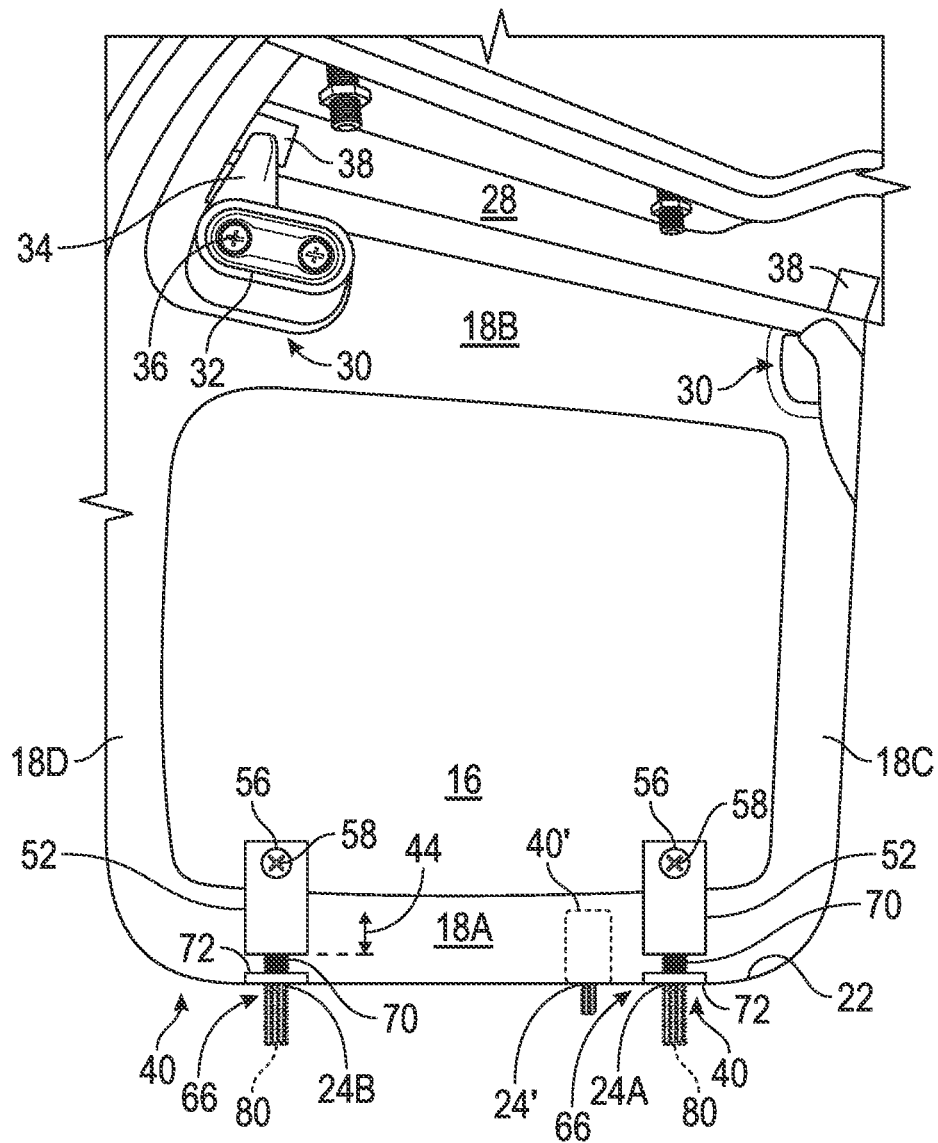
FIG. 3A is an interior view of the removable window assembly coupled to the vehicle.
Figure 3B:
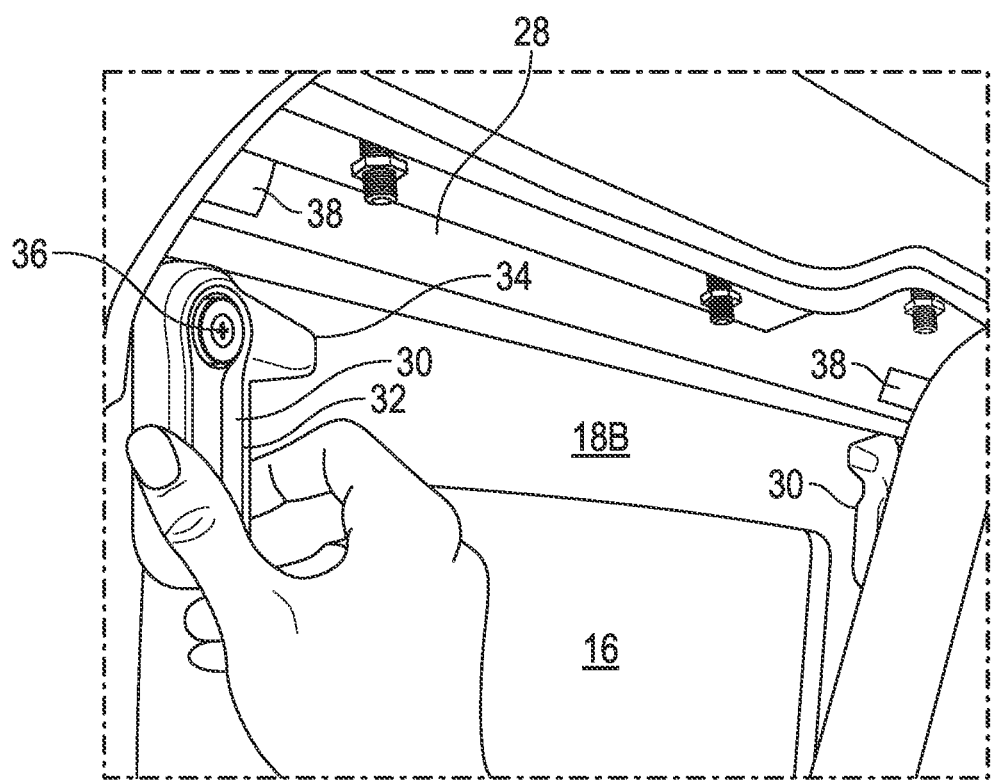
FIG. 3B is a perspective view of the latches 30 in a position to allow removal of the removable window assembly.

Referring now to FIGS. 3A and 3B, a perspective view from inside the vehicle 10 is illustrated. In this example, the upper frame portion 18A of the window frame 18 is illustrated in a latched position in FIG. 3A and an unlatched position in FIG. 3B. In this example, two latches 30 are illustrated having a handle 32 and a latch arm 34. The handle 32 and the latch arm 34 rotate about a pin 36. The latch arm 34 engages a catch 38 that is disposed on the roof rail 28. To release the panel 14 from being fixedly attached to the vehicle 10, the handle 32 is rotated so that the latch arm 34 rotates and disengages the catch 38 on the roof rail 28. The catch 38 has enough tolerance to allow the panel 14 to be secured it its many adjusted positions as described below.

At the lower frame portion 18A of the window frame 18, a panel adjustment assembly 40 is coupled thereto. In this example, two panel adjustment assemblies 40 are spaced apart and are used to couple the removable window frame assembly to the window rest 22 of the vehicle 10. In this example, the panel adjustment assembly 40 is affixed to the window 16 and extends into the vehicle 10 at the opening 24A, 24B. In another example, a panel adjustment assembly 40' is coupled to the lower window frame portion 18A and couples to an opening 24' within the vehicle 10. In the following example, the panel adjustment assembly 40 will be referred to as being coupled to the window 16. However, the other example coupled to the window frame 18 is understood.

Figure 4:
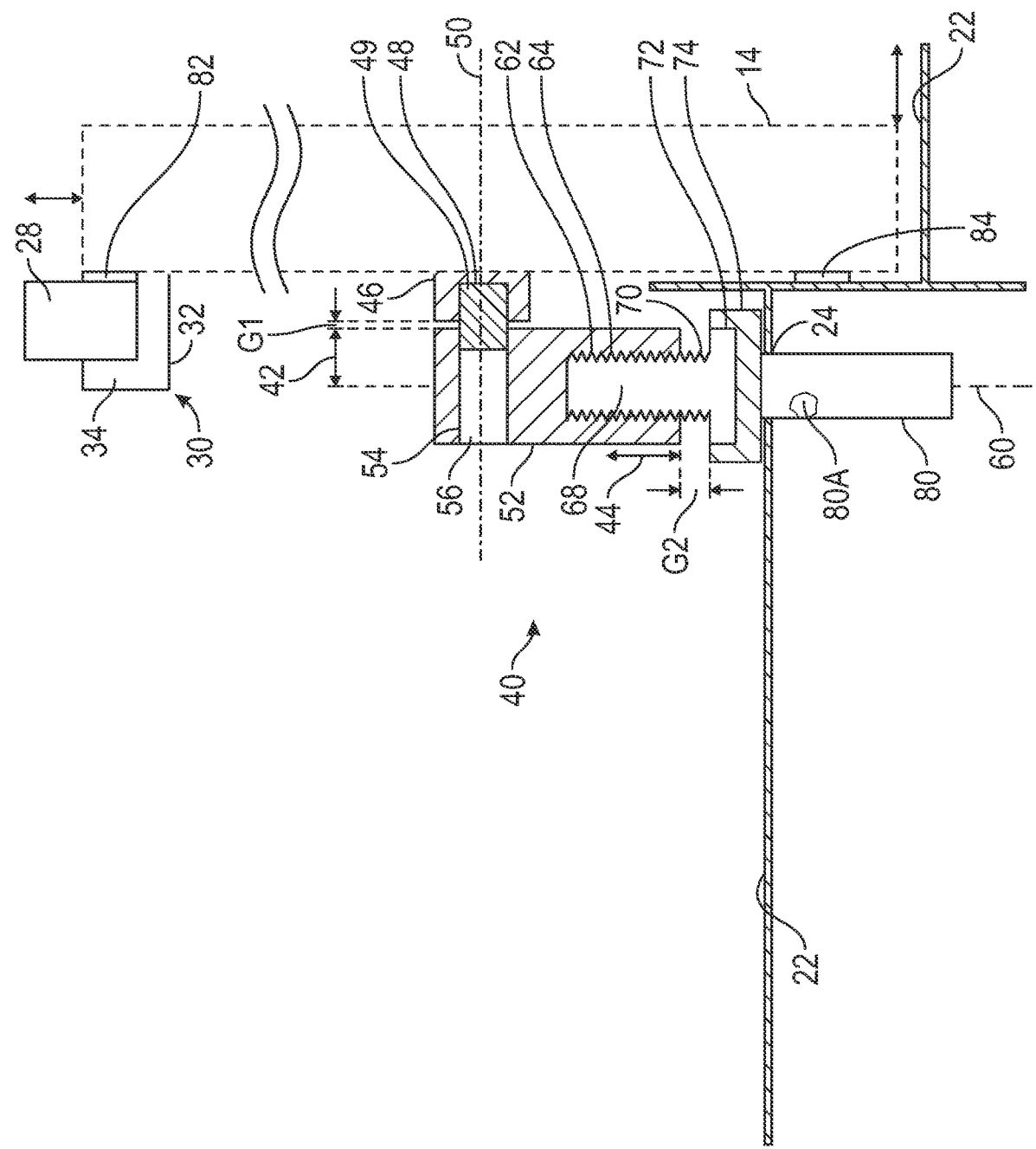
FIG. 4 is a cross-section view of the panel adjustment assembly 40 according to the present disclosure.

Referring now also to FIG. 4, the panel adjustment assembly 40 is illustrated in further detail. The panel adjustment assembly 40 is used for horizontally or laterally adjusting the window frame as indicated by the arrows 42. The word laterally is used relative to the overall vehicle 10. The arrows 44 indicated the movement of the panel 14 in a vertical direction relative to the vehicle.

The panel adjustment assembly 40 comprises a first bracket 46 that is fixed to the panel 14 at the window 16 or the window frame 18 or, more specifically, the lower window frame portion 18A. In this example, the first bracket 46 is glued to the window 16. The first bracket 46 has a first receiving opening 48 that extends in a longitudinal direction relative to the first bracket 46. The first receiving opening 48 has internal threads 49. The first receiving opening 48, in this example, is centered on the longitudinal axis 50. The first bracket 46, in this example, is formed from nylon 66. However, in other examples, metal is used to form the first bracket 46.

A second bracket 52 is moveably coupled to the first bracket 46. The second bracket 52 extends vertically relative to the vehicle 10. The second bracket 52 is elongated in the vertical direction. The second bracket 52 has a receiving channel 54 that extends therethrough. The receiving channel 54 is coaxial with the longitudinal axis 50 of the first bracket 46. An adjuster 56, such as a threaded fastener, engages the receiving opening 48 of the first bracket 46 and extends through the receiving channel 54 for adjustment. That is, the end of the adjuster 56 has an adjustment feature 58 such as a groove or grooves for a screwdriver or a receiver for an Allen wrench. Of course, a handle (not shown) is an alternative to a screw or Allen wrench. The adjuster 56 adjusts the gap G1 in the direction illustrated by the arrows 42. By moving the adjuster 56, the gap G1 is made greater or smaller. That is, the second bracket 52 is moved in the direction illustrated by the arrows 42 away from or toward the second bracket 52. The movement caused from adjusting the adjuster 56 is in the lateral direction of the vehicle.

The second bracket 52 has a longitudinal axis 60. The longitudinal axis 60 is perpendicular to the longitudinal axis 50 of the first bracket 46. The second bracket 52 has a receiving opening 62 that extends partially into the second bracket 52 in the direction of the longitudinal axis 60. The receiving opening 62 has internal threads 64. A second adjuster 66 has external threads 68 that engage the internal threads 64 of the receiving opening 62. The rotation of the second adjuster 66 moves the second adjuster 66 into or out of the receiving opening 62 to adjust the gap G2 in the direction illustrated by the arrows 44. That is, the second bracket 52 is moved in a vertical direction relative to the window rest 22.

The second adjuster 66 includes a base 72 that extends radially outward from the shaft 70. That is, the base 72 is annular around the shaft 70. The diameter of the base 72 is greater than the openings 24A, 24B so that the shaft 70 does not extend further into the openings 24A or 24B. The base 72 has a compliant layer 74 disposed thereon. In this example, the layer 74 is over molded onto the base 72. By comprising a compliant layer 74, the instances of rattles or other noise are reduced. The compliant layer 74, in this example, is formed of nylon.

A pin 80 extends in the longitudinal direction from the base 72. The pin 80, in this example, is not threaded. That is, the cylindrical walls of the pin 80 are smooth so that they easily slide into the opening 24. The pin 80 is inserted into the opening 24A, 24b up to the base 72. The pin 80 may have a compliant layer 80A disposed thereon. The compliant layer 80A may be a plastic overmolded onto a metal pin 80.

To adjust the position of the panel 14 in the vertical direction, the entire second adjuster 66 is rotated. That is, the base 72, the shaft 70 and the locating pin 80 are rotated. Because all the components of the second adjuster 66 are coupled together, the pin 80, the base 72, the compliant layer 74 thereon or the shaft 70 is rotated to adjust the gap G2 in a conventional manner. The rotation of the shaft 70 in the clockwise direction will close the gap G2 while rotation in the counterclockwise direction will open the gap G2.

An upper seal 82 and a lower seal 84 are disposed between the vehicle and the panel 14. In this example, the seals 82 and 84 are coupled to the panel 14. As the seals 82, 84 wear, the panel adjustment assembly 40 is be adjusted to pull the panel 14 inward the interior of the vehicle or vertically upward or downward relative to the vehicle 10.

To make adjustments, the latches 30 are released and the panel 14 is pulled upward so that the pin 80 clears the opening 24. The panel 14 is removed for engaging the vehicle 10. The adjustment is made by rotating the adjuster 56 and the adjuster 66 to obtain the desired position and which direction needs to be adjusted. For reassembly the pin 80 is placed within the respective opening 24A or 24B. The latches 30 are then rotated into position so that the latch arm 34 engages the catch 38. If readjustment is required, the panel 14 can be removed again and readjusted. The adjustment is maintained during normal operation as the panel 14 is placed and removed from the vehicle.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A panel adjustment assembly for a panel a vehicle comprising:
   a first bracket fixedly coupled to the panel, said first bracket comprising a first receiving opening coaxial with a first longitudinal axis;
   a second bracket comprising a second longitudinal axis, a channel coaxial with the first longitudinal axis and a second receiving opening coaxial with the second longitudinal axis;
   a first adjuster coaxial with the first longitudinal axis and coupled through the second bracket and into the first receiving opening in the first bracket, said first adjuster configured to adjust a first gap between the first bracket and the second bracket;
   a second adjuster disposed within the second receiving opening and partially within the second bracket, said second adjuster having a locating pin extending therefrom and configured to be received within the vehicle, said second adjuster configured to adjust a second gap between the vehicle and the second bracket.

2. The panel adjustment assembly of claim 1 wherein the panel comprises a window or a window frame.

3. The panel adjustment assembly of claim 2 wherein the first bracket fixedly is coupled to the window or the window frame.

4. The panel adjustment assembly of claim 1 wherein the first adjuster is disposed laterally through the second bracket.

5. The panel adjustment assembly of claim 1 wherein the second adjuster is disposed perpendicular to the first adjuster.

6. The panel adjustment assembly of claim 1 wherein the first adjuster comprises a threaded fastener.

7. The panel adjustment assembly of claim 1 wherein the second adjuster vertically adjusts the panel relative to a vehicle.

8. The panel adjustment assembly of claim 1 wherein the first adjuster laterally adjusts the panel relative to the vehicle.

9. The panel adjustment assembly of claim 1 wherein the second adjuster comprises a base adjacent to a threaded portion.

10. The panel adjustment assembly of claim 9 wherein the threaded portion is received in the second receiving opening.

11. The panel adjustment assembly of claim 9 wherein the locating pin is coaxial with the threaded portion.

12. The panel adjustment assembly of claim 11 wherein the locating pin comprises a compliant layer.

13. The panel adjustment assembly of claim 12 wherein the compliant layer is overmolded.

14. The panel adjustment assembly of claim 11 wherein the locating pin extends from the base and the base extends radially from the threaded portion.

15. The panel adjustment assembly of claim 14 wherein the base comprises a compliant layer thereon.

16. The panel adjustment assembly of claim 14 wherein the base is coaxial with the threaded portion and the locating pin.

17. A vehicle comprising
   a vehicle structure comprising a first opening and a second opening spaced apart from the first opening;
   the panel comprising a window;
   a first panel adjustment assembly as recited in claim 1 received within the first opening; and
   a second adjustment assembly as recited in claim 1 received within the second opening.

18. The vehicle of claim 17 wherein the first adjustment assembly and the second adjustment assembly are coupled to the window.

19. The vehicle of claim 17 wherein the first adjustment assembly and the second adjustment assembly are coupled to a lower window rest of the vehicle.

20. The vehicle of claim 17 further comprising a latch coupled to the panel said latch coupling the panel to the vehicle.

* * * * *